United States Patent

Titt

[15] 3,672,239
[45] June 27, 1972

[54] WORM GEAR DRIVE
[72] Inventor: Georg Titt, D-8358 Obere Vorstadt 9, Vilshofen, Germany
[22] Filed: Dec. 21, 1970
[21] Appl. No.: 100,317

[52] U.S. Cl. ................................................. 74/425, 74/464
[51] Int. Cl. .................... F16h 1/16, F16h 55/06, F16h 55/22
[58] Field of Search ..................................... 74/464, 459, 425

[56] References Cited

UNITED STATES PATENTS 3,365,974  1/1968  Lieberman ............................... 74/425
3,377,879  4/1968  Kozo Shiwaku ........................ 74/425
3,468,179  9/1969  Sedgwick et al. ....................... 74/425
3,489,026  1/1970  Bond ................................... 74/464 X
3,494,215  2/1970  Fengler ............................. 74/459 X
3,581,592  6/1971  Roehrs et al. ........................... 74/464

Primary Examiner—Leonard H. Gerin
Attorney—Steinberg and Blake

[57] ABSTRACT

A worm gear drive in which a worm coil is curved along the periphery of a worm wheel and has convolutions formed with peripheral grooves which receive rolling bodies which mesh with teeth at the periphery of the worm wheel.

10 Claims, 4 Drawing Figures

WORM GEAR DRIVE

BACKGROUND OF THE INVENTION

The present invention relates to worm gear drives.

With conventional worm gears, the structure almost invariably takes the form of a hindley's or hourglass screw so that a plurality of worm convolutions will participate in the transmission. The manufacture of such worms with corresponding rolling paths for rolling bodies is difficult to carry out, and the same is true of a worm wheel which cooperates with such a worm. Above all the grinding of the rolling path after hardening of the metal creates problems. However, not only has this latter disadvantage prevented practical utility of drives of this type up to the present time, but in addition the operating conditions encountered are not ideal. The hourglass screw does not operate with a constant pitch, and the rolling bodies travel at different speeds, while the configuration of the worm screw convolutions change in correspondence with the rolling action, so that the rolling bodies encounter different meshing conditions. The final effect is that only part of the rolling bodies can be expected to carry the transmission load.

SUMMARY OF THE INVENTION

It is accordingly a primary object of the present invention to provide a worm gear drive where the power is transmitted between the worm and worm wheel through balls or other rolling bodies, while avoiding the above drawbacks encountered with conventional worm gear drives.

In particular, it is an object of the present invention to provide a worm gear drive of this type which can achieve an efficiency which is far greater than that encountered with conventional worm gear drives.

Also, it is an object of the present invention to provide a worm gear drive of this type which can have an extremely large transmission ratio.

A further object of the present invention is to provide a worm gear drive of the above type which can readily be manufactured at relatively low cost while avoiding the difficulties encountered in the manufacture of conventional worm gear drives.

Yet another object of the present invention is to provide a worm gear drive where a considerable load can be transmitted while at the same time any individual part of the structure of the invention is not very greatly loaded.

A further object of the invention is to provide a construction of this type which is simple and rugged so that all of the advantages of the invention can be achieved at a relatively low cost and with a structure which will operate reliably over a long period of time.

According to the invention the worm gear drive includes a rotary worm wheel having a periphery provided with teeth, and a plurality of rolling bodies which engage these teeth. A worm coil is curved along the periphery of the worm wheel and has convolutions respectively provided with grooves which receive the rolling bodies and define a path of travel therefor.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
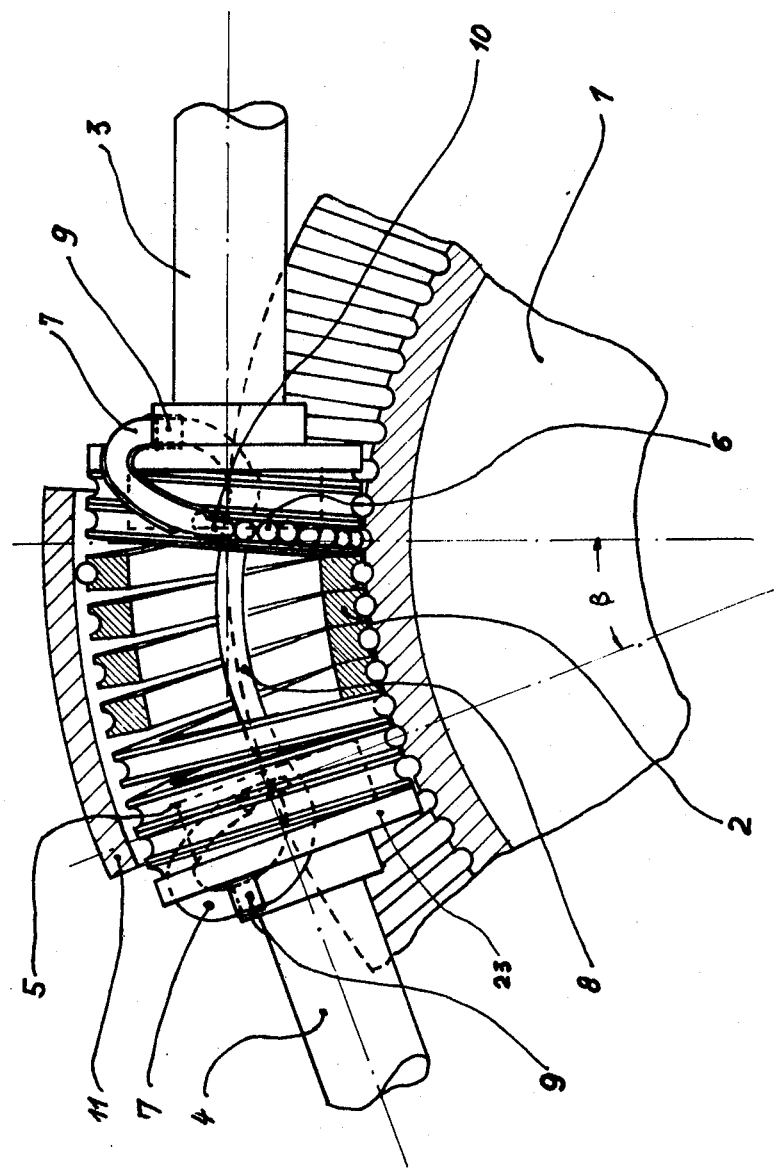
FIG. 1 is a fragmentary partly sectional elevation taken in a plane normal to the axis of the worm wheel and illustrating one possible embodiment of a worm gear drive according to the invention.

Referring to FIG. 1, there is illustrated part of a worm wheel 1 having a periphery provided with teeth which are engaged by the rolling bodies formed by the balls 6. A worm coil 2 of the invention is curved along the periphery of the worm wheel 1 so that in the illustrated example the worm coil 2 conforms through the angle $\beta$ to the curvature of the periphery of the worm wheel 1. The convolutions of the worm coil 2 are respectively formed with peripheral grooves which receive the rolling bodies 6 and form a path of travel therefor.

Figures 2, 3:
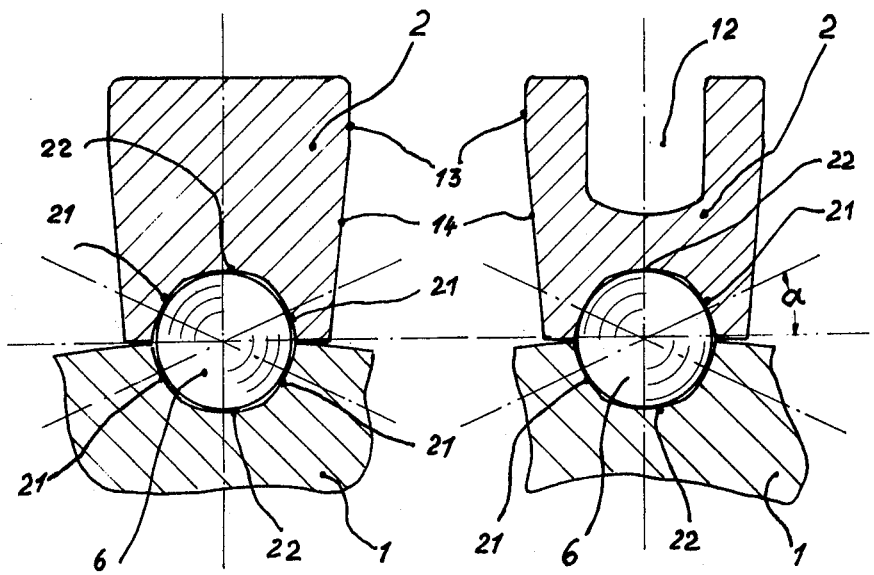
FIG. 2 is a fragmentary sectional elevation in the same plane as FIG. 1 showing the cross section of a convolution of the worm coil and also illustrating the manner in which the worm coil coacts with the worm wheel through a rotary body.
FIG. 3 shows a structure similar to FIG. 2 where the convolution of the worm coil has a greater elasticity.

As is apparent particularly from FIGS. 2 and 3, the convolutions of the worm coil 2 are of a tapered cross section at least in the region of the convolutions formed with the peripheral grooves which receive the rolling bodies 6. As a result the convolutions of the worm coil at least at the part thereof extending through the angle $\beta$ are capable of engaging each other at their side surfaces almost throughout the entire width of these side surfaces. The direct engagement between these side surfaces of the convolutions which are at the smallest radius of curvature of the worm coil along the angle $\beta$ is illustrated in FIG. 1.

Beyond this latter angle the worm coil 2 has some convolutions, in the region of the opposed ends of the worm coil, which no longer follow the curvature of the worm wheel 1 but which instead are positioned tangentially with respect to the periphery of the worm wheel 1. Shafts 3 and 4 are respectively fixed to the opposed ends of the worm coil 2.

These shafts 3 and 4 are supported for rotary movement in an unillustrated housing of the worm gear drive. This housing carries suitable thrust bearings which maintain the shafts 3 and 4 in axially predetermined positions while at the same time supporting them for rotary movement. These shafts 3 and 4 respectively terminate in enlarged end portions 5 on which the end convolutions of the coil 2 are placed so as to be centered by these end portions 5. The shafts 3 and 4 are respectively fixed with flanges 23 to which the end convolutions of the coil are respectively fixed so that through these flanges 23 the axial positions of the end convolutions are determined.

The teeth at the periphery of the worm wheel 1 are in the form of a hollow circular channel which receives the coil 2 and which extends circumferentially around the latter approximately up to the center thereof, so that the periphery of the worm wheel extends approximately half way around the worm coil 2. The remainder of the worm coil is surrounded by a shell 11 made of a hardened steel and having an inner ground surface with which the rolling bodies 6 make rolling contact when they travel beyond the periphery of the worm wheel 1. In this way the rolling bodies 6 serve to absorb the radial forces at the worm. This shell 11 is also fixed to the unillustrated housing of the worm gear drive.

A pair of end tubes 7, in which the rolling bodies 6 can travel, are operatively connected with a pair of convolutions of the coil 2, respectively, situated at opposed end regions of the latter, and these end tubes 7 are interconnected by an elastic connecting tube 8 which extends along the interior of the coil, so that the end tubes 7 and the connecting tube 8 form together with the peripheral grooves of the convolutions of the coil 2 an endless path of travel for the rolling bodies 6 which roll at approximately half the circumferential speed of the worm. Thus through the tubes 7 and 8 it is possible for the balls 6 to travel from one end region of the worm coil 2 through the interior of the latter to the other end region thereof. The end tubes 7 respectively terminate in fingers 10 which do not extend beyond the path of the rolling bodies 6 and serve to guide the balls 6 smoothly into one of the end tubes 7 and out of the other of the end tubes 7. The fingers 10 guide balls 6 smoothly with respect to the end tubes 7 which communicate with the grooves of the convolutions to which they are respectively fixed at depths somewhat deeper than these grooves. It is preferred to form the fingers 10 as integral parts of the end tubes 7. It will be noted that these end tubes 7 do not project outwardly beyond the exterior surface of the worm coil 2 which projects beyond the entire end tubes 7.

These tubes 7 in addition to being fixed respectively to a pair of convolutions at the end regions of the coil 2 are fixed to the flanges 23 through which these tubes 7 extend, and beyond these flanges the tubes 7 are connected to and communicate with the elastic connecting tube 8. The latter tube extends along the interior of the coil so as to convey the rolling bodies through the worm from one end tube 7 to the other. The connection 9 between each end tube 7 and an end of the tube 8 can take the form of a simple plug-and-socket type of connection according to which the ends of the tube 8 are simply pressed into ends of the tubes 7, respectively. After this latter connection of the tube 8 with the tubes 7 is formed, one end of the tube 8 can be fixed with the shaft 3 and the other end can be fixed with the shaft 4 through suitable clamping connections, while the end tubes 7 themselves may advantageously be fixed in position with a hard solder. The flexible connecting tube 8 can be made of plastic or it can take the form of a wire coil made of a wire of square cross section.

FIG. 2 illustrates the tapered, wedge-shaped profile of the convolutions of the worm 2. FIG. 2 also illustrates the manner in which the balls 6 mesh with the worm wheel and worm. The peripheral groove formed in each convolution of the coil 2 has symmetrical side surfaces 21 the configuration of which is designed to provide a rolling path for the rolling bodies where the meshing angle is as small as possible, while at the same time maintaining a pressure diagram which does not extend beyond the edges of the side surfaces 21. With this meshing angle $\alpha$, shown at the right in FIG. 3, the transmission of the invention will when loaded transfer the force from the worm 2 to the worm wheel 1. Because of the elasticity present in the system, the worm is displaced slightly away from the worm wheel, so that the rolling bodies only engage the path of travel provided therefor at the load points. However, when the transmission idles or runs without any loading, the rolling bodies 6 can fall back to the base surfaces 22 of the grooves which define the path of travel for the rolling bodies 6, so that at this time the rolling bodies 6 roll along the base surfaces 22 of the grooves. In this way direct engagement between the worm 2 and the worm wheel 1 is avoided.

In the embodiment of FIG. 3 the convolutions of the worm coil are each provided with a cross section formed at a peripheral portion opposite to the peripheral portion provided with the groove which receives the rolling bodies 6 with a second peripheral groove 12, so that in this way the elasticity of each convolution is increased and each convolution can yield elastically to compression forces. For this reason it is possible to provide for the embodiment of FIG. 3, at each of the convolutions, side surfaces 14 which are inclined with respect to each other at a somewhat larger angle of inclination than in the case of FIG. 2, so that only after curving of the worm along the periphery of the worm wheel will the convolutions engage each other, at the angular region $\beta$, along substantially the entire width of the side surfaces of the convolutions. Moreover, with the embodiment of FIG. 3 the circumferential length of engagement of the convolutions at the regions next to the periphery of the worm wheel and at the angular region $\beta$ is greater than with the convolution cross section which is illustrated in FIG. 2.

The inclined side surfaces 14 of each convolution extend from relatively narrow peripheral side surface regions 13 which are substantially perpendicular to the axis of the worm when the latter is in a straight condition. The end convolutions which do not bear the load engage each other at these regions 13.

Figure 4:
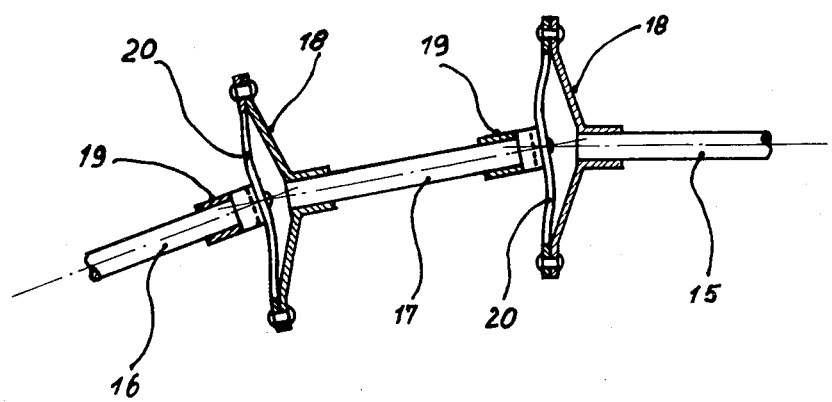
FIG. 4 is a schematic representation of a synchronizing assembly to be operatively connected with the worm coil for synchronizing the rotation of opposed ends thereof.

In order to reliably maintain a synchronized rotary movement for the worm shafts 3 and 4, they may be interconnected by the synchronizing structure which is shown in FIG. 4. This synchronizing structure includes a pair of end synchronizing shafts 15 and 16 and an intermediate synchronizing shaft 17 axially situated between the end synchronizing shafts 15 and 16. A universal joint interconnects each of the end shafts 15 and 16 with the intermediate shaft 17. Each universal joint includes the forked or bifurcated members 18 and 19 fixed to an elastic ring 20. Each of the members 18 and 19 may take the form, for example, of a pair of fingers extending in opposite lateral directions from the axis of the universal joint, the pair of fingers of member 18 being displaced by 90° with respect to the pair of fingers of member 19. Thus, the ends of the fingers of member 18 will be fixed to the elastic ring 20 at diammetrically opposed parts of the latter while the ends of the fingers of member 19 will be fixed to the ring 20 also at diammetrically opposed parts of the latter, with these connections of the fingers of member 19 being displaced by 90° with respect to the connections of the fingers of member 18. These members 18 and 19 respectively have tubular hub portions which are respectively fixed with the shafts 15-17 in the manner shown in FIG. 3. The shafts 15 and 16 may extend parallel to the shafts 3 and 4 and gears which are fixed to the shafts 15 and 16 may mesh with gears which are fixed to the shafts 3 and 4, so that through the structure of FIG. 4 the shafts 3 and 4 will be compelled to rotate in synchronism with each other.

With the above-described structure of the invention the disadvantages of conventional structures are avoided and at the same time several additional advantages are achieved. Thus, with the invention a curved flexible worm is used instead of a straight massive worm. When the worm of the invention is in a straight condition it has the configuration of a spiral or coil spring. By curving this worm of the invention it is possible to adapt it to a predetermined peripheral portion of the worm wheel. In this way great advantages are achieved in that each convolution of the worm coil is situated in a radial plane which contains the axis of the worm wheel so that each convolution has with respect to the worm wheel an operating relation which is as good as that which could be achieved if the worm gear were provided with a worm having only a single convolution.

Moreover, when the worm of the invention is manufactured this worm can be in a straight condition so that it is simple to carry out the grinding operations. The elongated bar or rod stock from which the worm coil is manufactured can initially be advantageously drawn so that the soft working thereof can be very simply and effectively carried out. Under suitable conditions further operations on the worm are not required after the winding of the convolutions thereof and the hardening thereof.

As a result of curving of the worm along the periphery of the worm wheel, the individual convolutions press against each other at the inner part of the worm which directly engages the worm wheel, so that as a result of the frictional connection between these convolutions the required circumferential force is transmitted from one convolution to the next. It is for this purpose that the present invention provides for the convolutions the tapered cross section as shown in FIGS. 2 and 3 and described above, so that in this way, in correspondence with the diameter of the worm wheel, the individual convolutions can engage each other through as great a width as possible in order to reduce the pressure per unit of area to as low a value as possible. With the groove 12 shown in FIG. 3 it is possible to provide each convolution of the worm with an elasticity at its inner region which will achieve also in the circumferential direction a longer length of engagement between the individual convolutions. In this way it is possible to select a suitable compromise according to which in accordance with the given direction of rotation of the convolutions the entire thrust of the load is distributed among all of the convolutions without overloading the latter, while on the other hand as large a number of convolutions as possible participate in the meshing of the rolling bodies with the worm wheel.

A further advantage of the invention resides in the fact that the worm wheel can circumferentially extend around the worm through 180° or approximately half way around the worm, without creating in this way any different operating conditions. Inasmuch as the individual worm convolutions are elastic through this region, the pressure changes from the central or deepest part of the worm wheel periphery where the worm convolutions directly engage each other to the outer edges of the worm wheel channel which receives the worm. Bending of the worm coil to a condition where it will assume a larger curvature then that which it has when cooperating properly with the worm wheel cannot take place since in this event the individual convolutions of the worm will come to press through the rolling bodies against the unloaded sides of the path of travel provided for the rolling bodies in the worm wheel.

The shell 11 referred to above forms a further feature of the invention since this shell also serves to take up the radial forces of the worm while at the same time providing a surface of rolling contact for the rolling bodies when they travel beyond the worm wheel. With conventional worm gears the bearings of the worm are required to absorb these radial forces. These advantages are achieved with the feature of the invention according to which the rolling path for the rolling bodies, both at the worm and the worm wheel, is made up of three surfaces of curvature provided for the surfaces 21 and 22. The symmetrical surfaces 21 have the same curvature which permits the smallest possible angle of engagement $\alpha$, while the base 22 remains to engage the rolling bodies so as to prevent any direct engagement between the worm and worm wheel as soon as a load is no longer transmitted, so that the worm and worm wheel can never come into direct engagement with each other.

With the feature of the invention according to which some of the end convolutions at each of the end regions of the worm are positioned tangentially with respect to the worm wheel, these end convolutions directly engage each other along their entire lengths. The shafts 3 and 4 which are connected to the ends of the worm coil are themselves supported for rotary movement in suitable bearings within the housing of the worm gear drive. The removal of rolling bodies from the worm and the return of the rolling bodies to the worm takes place at these end regions of the worm, so that the steel end tubes 7 with their fingers 10 are fixed only to the free end regions of the worm and to the shafts 3 and 4, while the bendable connecting tube 8 is situated in the interior flexible portion of the worm in order to provide the endless path of travel for the balls 6. As is pointed out above the connecting tube 8 can be formed from a coil spring the convolutions of which directly engage each other and the wire of which has a square cross section.

The length of the curved worm can have any desired magnitude, while the diameter is chosen in such a way that the profile or cross section of each convolution is deformed only to a small extent. A relatively small friction factor of approximately 0.001 to 0.0015 for the rolling friction enables an extremely small pitch to be provided for the worm of the invention without any appreciable losses.

As is pointed out above in connection with FIG. 4, it is also a feature of the invention to provide for synchronized rotary movement of the ends of the worm by way of the synchronizing shafts 15–17 and the universal joints therebetween.

What is claimed is:

1. In a worm gear drive, a worm wheel having a periphery provided with teeth, rolling bodies engaging said teeth and a worm coil curved along part of the periphery of said worm wheel and having convolutions respectively formed with peripheral grooves receiving said rolling bodies and defining a path of travel therefor.

2. The combination of claim 1 and wherein said convolutions of said worm coil are of a tapered cross section at least in the regions thereof provided with said grooves, and said convolutions having side surfaces directly engaging each other in the immediate vicinity of said periphery of said worm wheel.

3. The combination of claim 1 and wherein said convolutions are respectively formed with peripheral grooves opposed to those which receive said rolling bodies for increasing the elasticity of said convolutions.

4. The combination of claim 1 and wherein said worm coil has opposed end regions provided with convolutions positioned tangentially with respect to said periphery of said worm wheel.

5. The combination of claim 1 and wherein said periphery of said worm wheel has the configuration of a hollow channel and extends approximately half way around said worm coil, and a hollow shell extending around the remainder of said worm coil and having an inner surface engaged by said rolling bodies when they travel beyond said teeth of said worm wheel.

6. The combination of claim 1 and wherein a pair of end tubes in which said rolling bodies travel are respectively fixed to a pair of said convolutions at opposed end regions of said worm coil, and a connecting tube in which said rolling bodies also travel extending between and interconnecting said end tubes, said end tubes and connecting tube forming with the peripheral grooves of said convolutions an endless path of travel for said rolling bodies.

7. The combination of claim 6 and wherein said end tubes respectively have fingers engaging the rolling bodies at the peripheral grooves of said convolutions to which said end tubes are respectively fixed, said fingers respectively guiding said rolling bodies into one of said end tubes from the peripheral groove of the convolution to which the latter end tube is fixed and out of the other end tube into the peripheral groove of the convolution to which said other end tube is fixed.

8. The combination of claim 7 and wherein said worm coil has opposed end regions each provided with convolutions positioned tangentially with respect to said periphery of said worm wheel, a pair of flanges respectively fixed to opposed ends of said worm coil, and a pair of shafts respectively fixed to said flanges, said convolutions to which said end tubes are respectively fixed forming a pair of those which are positioned tangentially with respect to said periphery of said worm wheel and said end tubes also being fixed with said flanges.

9. The combination of claim 1 and wherein said peripheral groove of each convolution is defined by a pair of opposed symmetrical side surfaces and a base surface extending between said side surfaces.

10. The combination of claim 1 and wherein a pair of worm shafts are respectively connected with opposed ends of said worm coil, and a series of three synchronizing shafts axially spaced from each other and extending along the exterior of said worm coil and worm shafts, said synchronizing shafts including a pair of end shafts and an intermediate shaft situated therebetween, and a universal joint situated between and operatively connected to each of said end shafts and said intermediate shaft, so that by connecting said end synchronizing shafts to said worm shafts the latter can be compelled to rotate in synchronism with each other.

* * * * *